United States Patent
Lapstun

(10) Patent No.: US 7,528,972 B2
(45) Date of Patent: May 5, 2009

(54) PAGEWIDTH INKJET PRINTER FOR DUPLEX PRINTING WITH TRANSFER ROLLERS

(75) Inventor: Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 61 days.

(21) Appl. No.: 11/202,107

(22) Filed: Aug. 12, 2005

(65) Prior Publication Data

US 2005/0270356 A1    Dec. 8, 2005

Related U.S. Application Data

(63) Continuation of application No. 10/421,824, filed on Apr. 24, 2003, now Pat. No. 6,982,799, which is a continuation of application No. 09/505,008, filed on Feb. 15, 2000, now Pat. No. 6,559,969.

(30) Foreign Application Priority Data

Apr. 23, 1999   (AU) .................................. PP9960

(51) Int. Cl.
G06F 3/12       (2006.01)
G06F 15/00      (2006.01)
G06K 1/00       (2006.01)
G06K 15/00      (2006.01)

(52) U.S. Cl. ................. 358/1.13; 358/1.12; 358/1.18

(58) Field of Classification Search ............. 358/1.12, 358/1.13, 1.18, 1.9
See application file for complete search history.

(56) References Cited

U.S. PATENT DOCUMENTS

| | | | |
|---|---|---|---|
| 5,124,720 A | 6/1992 | Schantz | |
| 5,208,605 A | 5/1993 | Drake | |
| 5,432,539 A | 7/1995 | Anderson et al. | |
| 5,558,449 A * | 9/1996 | Morgavi ................... | 400/188 |
| 5,581,284 A | 12/1996 | Hermanson | |
| 5,587,730 A | 12/1996 | Karz | |
| 5,617,216 A | 4/1997 | Wada | |
| 5,646,744 A * | 7/1997 | Knox ...................... | 358/401 |
| 5,665,249 A | 9/1997 | Burke et al. | |
| 5,689,344 A | 11/1997 | Ebner | |
| 5,699,091 A | 12/1997 | Bullock et al. | |
| 5,745,657 A | 4/1998 | Barry et al. | |

(Continued)

FOREIGN PATENT DOCUMENTS

EP    0771656 A2    5/1997

(Continued)

*Primary Examiner*—James A Thompson

(57) ABSTRACT

An inkjet pagewidth printer includes a chassis. A print media feed mechanism is mounted on the chassis to feed print media along a feed path. A pair of opposed transfer rollers are rotatably mounted on the chassis to contact the print media as it is moved along the feed path. A displacement mechanism is operatively engaged with the transfer rollers to displace the rollers into and out of engagement with the print media. A pair of opposed pagewidth printhead assemblies is mounted on the chassis to carry out a printing operation on respective transfer rollers so that print can be transferred to the print media. A cleaning station is operatively positioned with respect to the transfer rollers to clean the rollers subsequent to the print being transferred to the rollers. Control circuitry controls operation of the printer. A memory stores data related to images and text to be printed.

7 Claims, 12 Drawing Sheets

U.S. PATENT DOCUMENTS

| | | | |
|---|---|---|---|
| 5,754,746 A | 5/1998 | Blurfrushan et al. | |
| 5,758,042 A | 5/1998 | Deschuytere | |
| 5,764,254 A * | 6/1998 | Nicoloff et al. | 347/43 |
| 5,809,181 A | 9/1998 | Metcalfe | |
| 5,820,275 A | 10/1998 | Crawford et al. | |
| 5,832,338 A * | 11/1998 | Kuga | 399/82 |
| 5,867,632 A | 2/1999 | Andree et al. | |
| 5,880,749 A | 3/1999 | Kikkawa et al. | |
| 5,914,734 A * | 6/1999 | Rotering et al. | 347/28 |
| 5,915,079 A | 6/1999 | Vondran et al. | |
| 5,929,875 A | 7/1999 | Su et al. | |
| 5,949,964 A | 9/1999 | Clouthier et al. | |
| 5,956,468 A | 9/1999 | Ancin | |
| 5,984,446 A | 11/1999 | Silverbrook | |
| 6,002,847 A | 12/1999 | Silverbrook | |
| 6,018,640 A * | 1/2000 | Blackman et al. | 399/364 |
| 6,036,300 A | 3/2000 | Suzuki et al. | |
| 6,039,438 A | 3/2000 | Beerling et al. | |
| 6,049,390 A | 4/2000 | Notredame et al. | |
| 6,053,609 A | 4/2000 | Barton et al. | |
| 6,075,897 A | 6/2000 | Kosugi | |
| 6,089,693 A | 7/2000 | Drake et al. | |
| 6,121,997 A | 9/2000 | Fukushima | |
| 6,198,850 B1 | 3/2001 | Banton | |
| 6,272,252 B1 | 8/2001 | Eldridge et al. | |
| 6,337,747 B1 | 1/2002 | Rosenthal | |
| 6,354,689 B1 | 3/2002 | Couwenhoven et al. | |
| 6,364,451 B1 | 4/2002 | Silverbrook | |
| 6,429,948 B1 | 8/2002 | Rumph et al. | |
| 6,454,378 B1 | 9/2002 | Silverbrook | |
| 6,459,497 B1 | 10/2002 | Kashiwazaki | |
| 6,533,390 B1 | 3/2003 | Silverbrook | |
| 6,559,969 B1 | 5/2003 | Lapstun | |
| 2003/0169441 A1 | 9/2003 | Garcia et al. | |

FOREIGN PATENT DOCUMENTS

| | | |
|---|---|---|
| EP | 0894637 A2 | 2/1999 |
| JP | 679956 A | 3/1994 |
| JP | 08-207321 | 8/1996 |
| WO | WO 95/35623 A1 | 12/1995 |
| WO | WO 99/04368 | 1/1999 |
| WO | WO 99/08875 A1 | 2/1999 |

* cited by examiner

PAGEWIDTH INKJET PRINTER FOR DUPLEX PRINTING WITH TRANSFER ROLLERS

CROSS REFERENCE TO RELATED APPLICATION

The present application is a continuation of U.S. application Ser. No. 10/421,824, filed Apr. 24, 2003, now issued U.S. Pat. No. 6,982,799, which is a continuation of U.S. application Ser. No. 09/505,008, filed Feb. 15, 2000, now issued as U.S. Pat. No. 6,559,969, the entire contents of which are herein incorporated by reference.

FIELD OF THE INVENTION

This invention relates to a printer. More particularly, the invention relates to a printhead controller for controlling printing of an image by a printhead and to a method of controlling a printhead.

SUMMARY OF THE INVENTION

According to a first aspect of the invention, there is provided a printhead controller for controlling printing of a page by at least one printhead, the printhead controller being connected, in use, via a data communications link to a printer controller for receiving data, in a compressed format, relating to the page to be printed, the data including a page description comprising a bi-level black layer and a contone color layer, the printhead controller including a first decoding means for expanding compressed data relating to the bi-level black layer;

a second decoding means for expanding compressed data relating to the contone color layer, the first and second decoding means being arranged in parallel;

a first temporary storage device for storing the expanded data from the first decoding means;

a second temporary storage device for storing the expanded data from the second decoding means;

a data manipulating means for manipulating the data output from the first and second temporary storage devices to be fed to the printhead; and a printhead interface at an output from the data manipulating means for controlling at least one printhead connectable to the interface and for feeding the manipulated data to the printhead.

The printhead may be a pagewidth printhead. In this specification, unless the context clearly indicates otherwise, the term "pagewidth printhead" is to be understood as a printhead having a printing zone that prints one line at a time on a page, the line being parallel either to a longer edge or a shorter edge of the page. The line is printed as a whole as the page moves past the printhead and the printhead is stationary, ie it does not raster or traverse the page.

The first decoding means may be a lossless bi-level decompression device for decompressing the bi-level black layer. The decompression device may be a standard Group 4 Fax decoder.

The second decoding means may be a high quality lossy decompression device for decompressing the contone color layer. The decompression device may be a standard JPEG decoder.

The data manipulating means may include a ditherer/compositor unit and a third temporary storage device at an output to the unit, the unit being operable to composite the bi-level black layer on the contone color layer after dithering of the color layer. The unit may be a custom built unit.

Each of the first temporary storage device, the second temporary storage device and the third temporary storage device may be a FIFO. It will be appreciated that the functional units are pipelined with the FIFO's which are on-chip and arranged between each functional unit and its successor in the pipeline.

According to a second aspect of the invention, there is provided in a printhead controller for controlling printing of a page by a printhead, the printhead controller being connected, in use, via a data communications link to a printer controller for receiving data, in a compressed format, relating to the page to be printed, the data including a page description comprising a bi-level black layer and a contone color layer, a method of controlling at least one printhead connected to the printer controller includes the steps of expanding compressed data relating to the bi-level black layer;

expanding compressed data relating to the contone color layer;

storing the expanded data in first and second temporary storage devices respectively;

feeding the expanded data from the storage devices to a data manipulating means;

manipulating the data into a format suitable for printing;

loading at least one printhead with dots to be printed in accordance with the formatted manipulated data; and printing the dots.

The steps of expanding the two layers may occur substantially simultaneously. The method may include expanding the data relating to the bi-level black layer using a lossless bi-level decompression device. The method may also include expanding the data relating to the contone color layer using a high quality lossy decompression device.

The manipulating of the data may include dithering the contone color layer, compositing the bi-level black layer on the dithered contone color layer and temporarily storing a dithered/composited layer so formed in a storage device prior to printing the dots.

The method may include operating the printhead controller as a self-synchronizing pipeline.

In another form there is provided a printhead controller for controlling printing of a page by at least one printhead, the printhead controller, in use, receiving data, in a compressed format, relating to the page to be printed, the data including a page description comprising a bi-level black layer and a contone color layer, the printhead controller including:

a decoding unit that extracts first data relating to the bi-level black layer and second data relating to the contone color layer from the compressed data;

memory that temporarily stores the first and second data;

a ditherer/compositor unit operable to:

produce a dithered bi-level color layer based on the second data, produce a bi-level black layer based on the first data and composite the bi-level black layer on the color layer after dithering thereof to produce a page image.

The printhead controller may include a printhead interface that controls at least one printhead connected to the interface and that feeds the page image to the at least one printhead.

The decoding unit may include a first decoded that extracts the first data and a second decoder that extracts the second data. The first and second decoders may be arranged in parallel. The first decoder is preferably a lossless bi-level decompression device for decompressing the bi-level black layer and the second decoder is a high-quality lossy decompression device for decompressing the contone color layer.

The memory may be include a first memory device that stores the first data and a second, physically distinct, memory device that stores the second data. A third memory device that receives the page image may be provided. Each of the memory devices may be a dedicated, on-chip FIFO.

The printhead controller preferably functions as a self-synchronizing pipeline.

The invention, in a further broad form, also provides a method of creating and printing a page image from data, in a compressed format, relating to a page to be printed, the data including a page description comprising a bi-level black layer and a contone color layer, includes the steps of:

extracting first data relating to the bi-level black layer from the compressed data;

extracting second data relating to the contone color layer from the compressed data;

storing the in first and second data in memory;

retrieving the first and second data from the memory;

creating a dithered bi-level color layer from the second data;

creating bi-level black layer from the first data compositing the bi-level black layer on the dithered bi-level color layer to create a dithered/composited page image, and printing the page image.

The first and second data may be extracted substantially simultaneously. The first data may be extracted using a lossless bi-level decompression device. The second data may be extracted using a high quality lossy decompression device.

The page image may be temporarily stored in a storage device prior to printing.

When performed in a printhead controller, the printhead controller may be operated as a self-synchronizing pipeline.

BRIEF DESCRIPTION OF THE DRAWINGS

The invention is now described by way of example with reference to the accompanying drawings in which.

DETAILED DESCRIPTION OF THE DRAWINGS

1 S-Print Overview

The invention will be described with reference to a high-speed duplex network color printer intended for high-volume office use. It features 2000-sheet motorized paper trays, 120 page-per-minute operation, and 1600 dpi photographic-quality output. We refer to the printer as the "S-print" and we shall refer to it as such or as the printer below.

With 20 times the speed of the best network color laser printers, and 4 times the speed of the best network monochrome laser printers, S-print effectively targets the $40 billion desktop laser printer market. With its high performance and photographic-quality output, it also competes against offset printing for print runs smaller than 5000 copies.

S-print accommodates A4/Letter sized media and, with a tray adaptor, A3/Tabloid sized media. It achieves simultaneous high quality and performance using full-color page-width 1600 dpi microelectromechanical inkjet (Memjet) printheads.

S-print uses an embedded DSP-based raster image processor (RIP) to rasterize Postscript and PCL page descriptions at high speed. The standard RIP uses a single DSP, but up to three additional DSP modules can be plugged in to increase performance.

The RIP compresses and stores the rasterized page images on an internal high-capacity hard disk. While simple page descriptions are rasterized at the full 120 ppm printing rate, more complex page descriptions may take longer. Pre-rasterized documents retrieved from the internal hard disk are always printed at the full 120 ppm printing rate. Any document can be "printed" to the hard disk, i.e. rendered and stored on the hard disk, for later high-speed retrieval.

Users can walk up to an S-print, select locally-stored documents on its color LCD, and print them immediately, without ever going near a workstation. Documents printed in this way always print at the full 120 ppm rate. The standard 14 GB internal hard disk stores over 6000 image-intensive pages. Because of its walk-up capability and high speed, S-print is likely to displace many uses of short-run offset printing.

S-print uses duplexed printheads for simultaneous double-sided printing. During the pilot phase of Memjet printhead manufacturing when the printhead defect density is still potentially high, each printhead is replicated to achieve 2:1 nozzle redundancy. This allows factory-detected defective nozzles to be bypassed, and so maximises printhead yield. A pair of custom print engine controllers expand, dither and print page images to the duplexed printheads in real time.

Apart from custom print engine controllers and Memjet printheads, S-print is built using standard off-the-shelf electronic components.

2 Printer Mechanics

Figure 1:
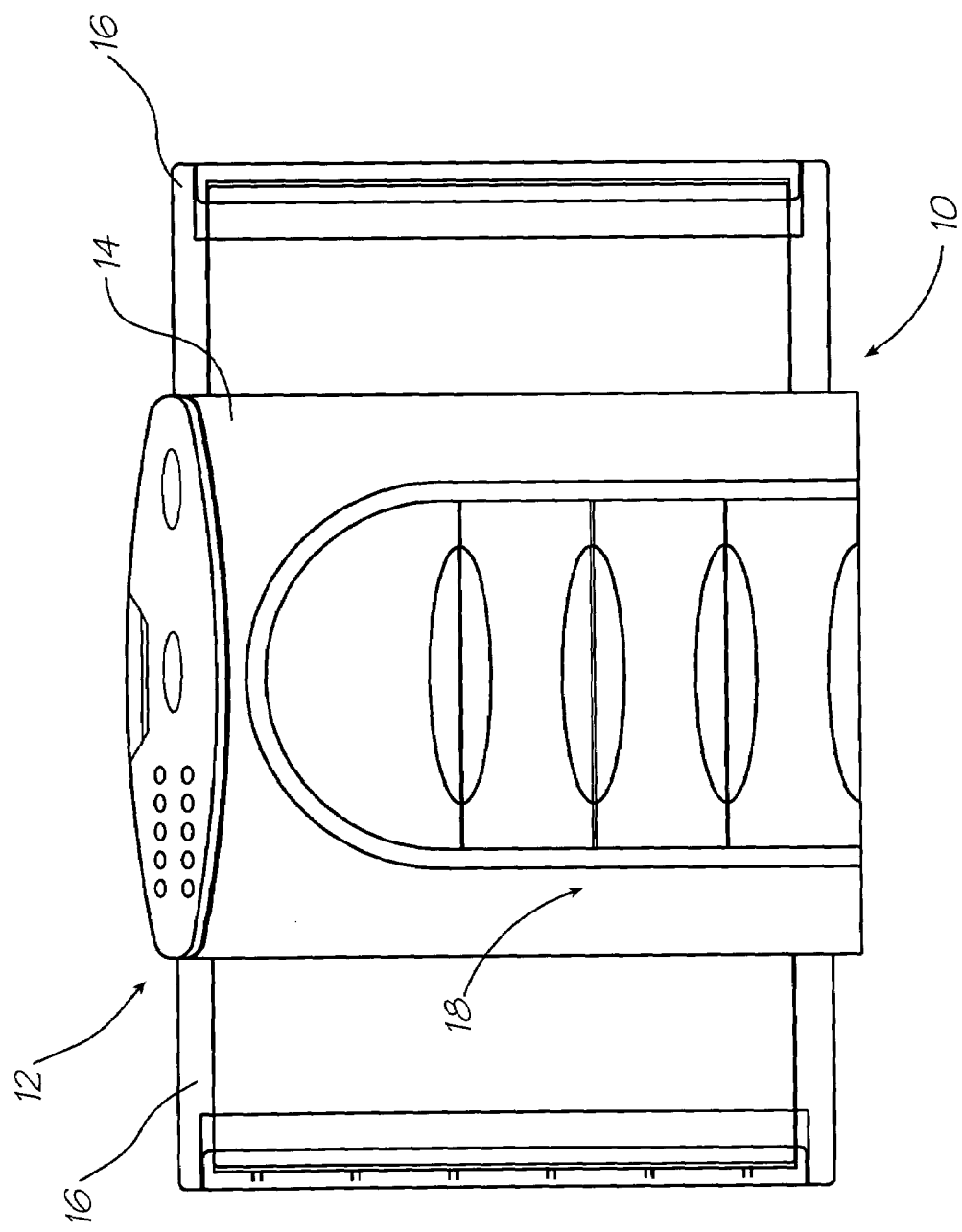
FIG. 1 shows a plan view of a printer, in accordance with the invention.
Figure 2:
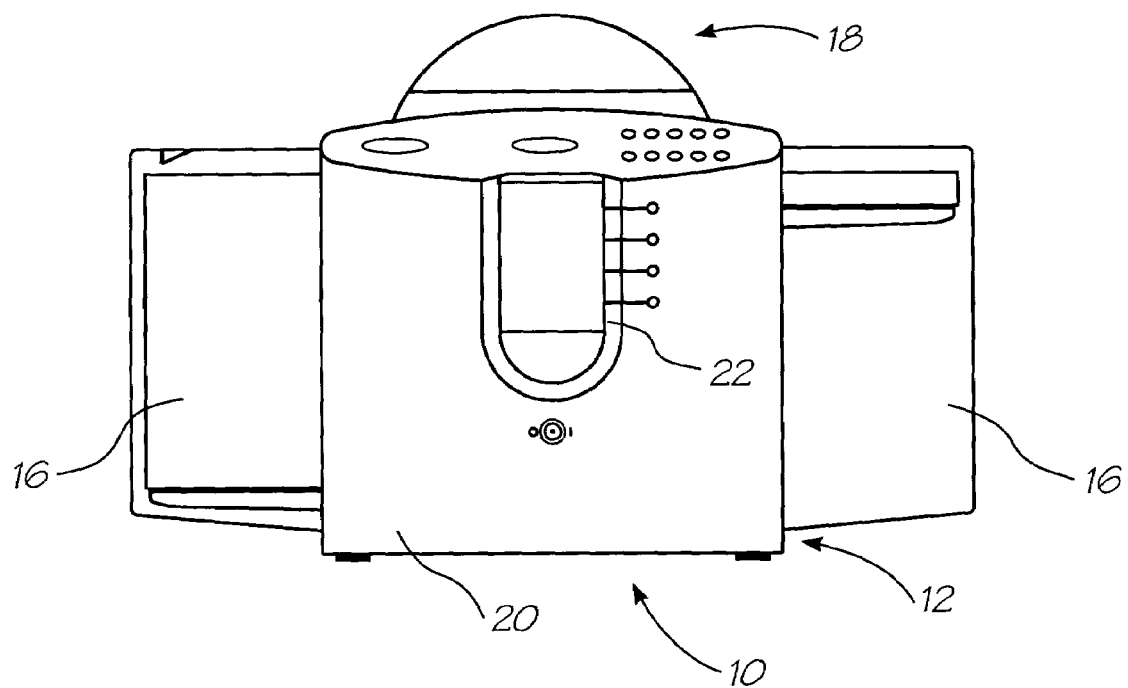
FIG. 2 shows a front view of the printer.
Figure 3:
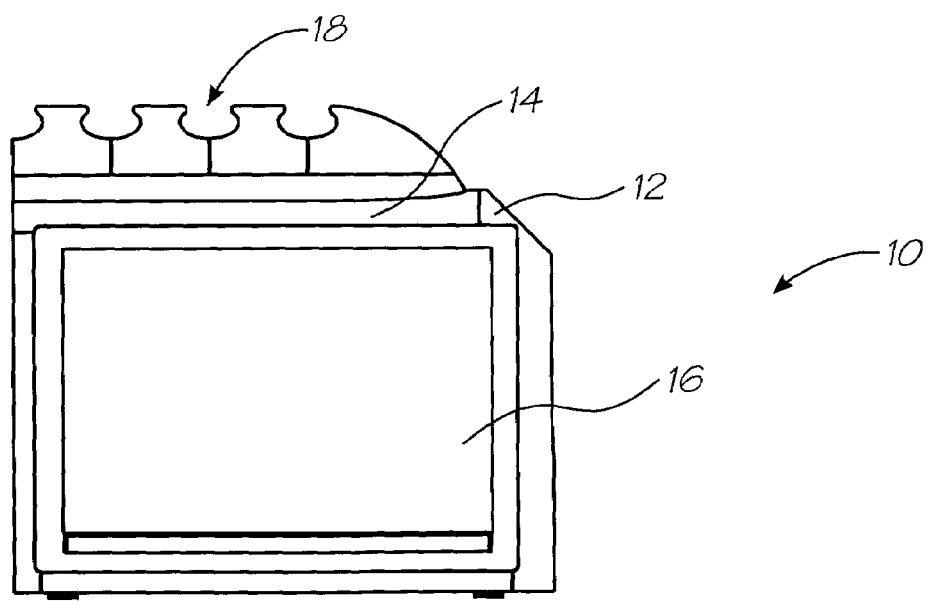
FIG. 3 shows a side view of the printer.

S-print is designated generally by the reference numeral 10 and comprises a housing 12 having a central section 14 (FIGS. 1 and 2). A hinged tray housing 16 projects from each side of the central section 14 (FIG. 3).

Ink cartridges 18, which will be described in greater detail below, are mounted on top of the central section 14 to be readily accessible.

A front face 20 of the central section 14 houses a display 22. The display 22, which will be described in greater detail below with reference to FIG. 7 of the drawings, is a full color LCD user interface.

Figure 4:
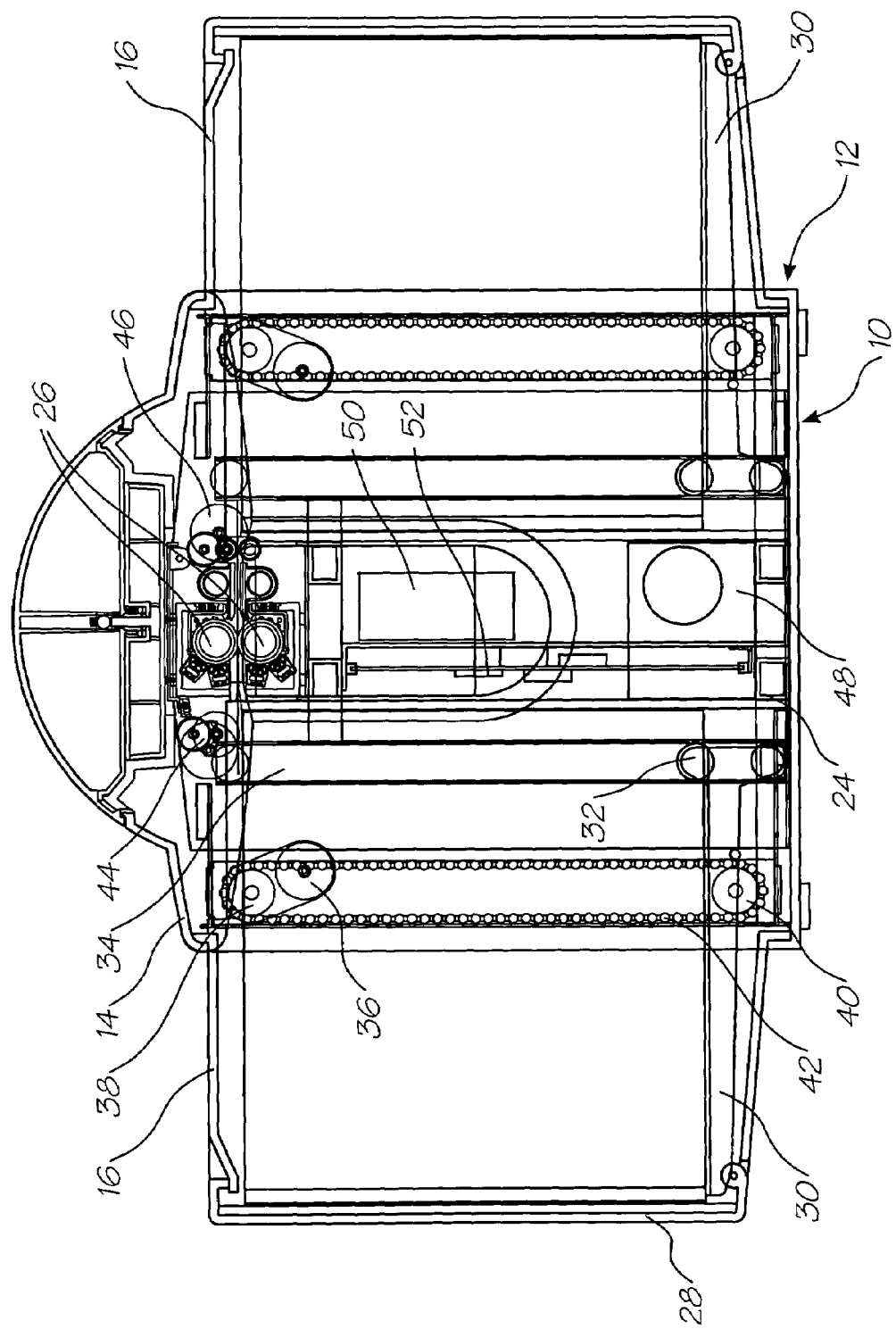
FIG. 4 shows a schematic, sectional front view of the printer.

Referring now to FIG. 4 of the drawings, a schematic front view of S-print 10 is shown.

The housing 12 is constructed around a box chassis 24. Print engines 26 are centrally located in the central section 12. The print engines 26 will be described in greater detail below with reference to FIG. 6 if the drawings.

On either side of the central section 14, and projecting outwardly therefrom is one of the paper tray housings 16. Each paper tray housing 16 has a bottom or side hinged door 28. A platen 30 is located in each paper tray housing 16 for supporting a load of papers. An operatively inner end of each platen 30 has a guide roller 32 which is received in a vertically extending channel 34 for guiding vertical movement of the platen 30. Each platen 30 is driven by a motor 36. The motor 36 drives a sprocket 38. A second sprocket 40 is mounted vertically below the sprocket 38. The sprockets 38 and 40 are interconnected by an endless chain 42 which drives vertical movement of the platen 30.

A first motor assembly 44 is arranged upstream of the print engines 26 for feeding print media, in the form of a sheet of paper, between the print engines 26. A second motor assembly 46 is arranged downstream of the print engines 26 for drawing the sheet of paper from the print engines 26 after printing.

The platens 30 rise and descend according to the volume of paper in the input and output stacks.

A compact power supply 48 is arranged below the print engines 26 as is a 14 GB hard disk drive (HDD) 50 and controlling circuitry 52.

S-print 10 prints the long edge of the paper to achieve a compact form factor and a minimized footprint.

Figure 5:
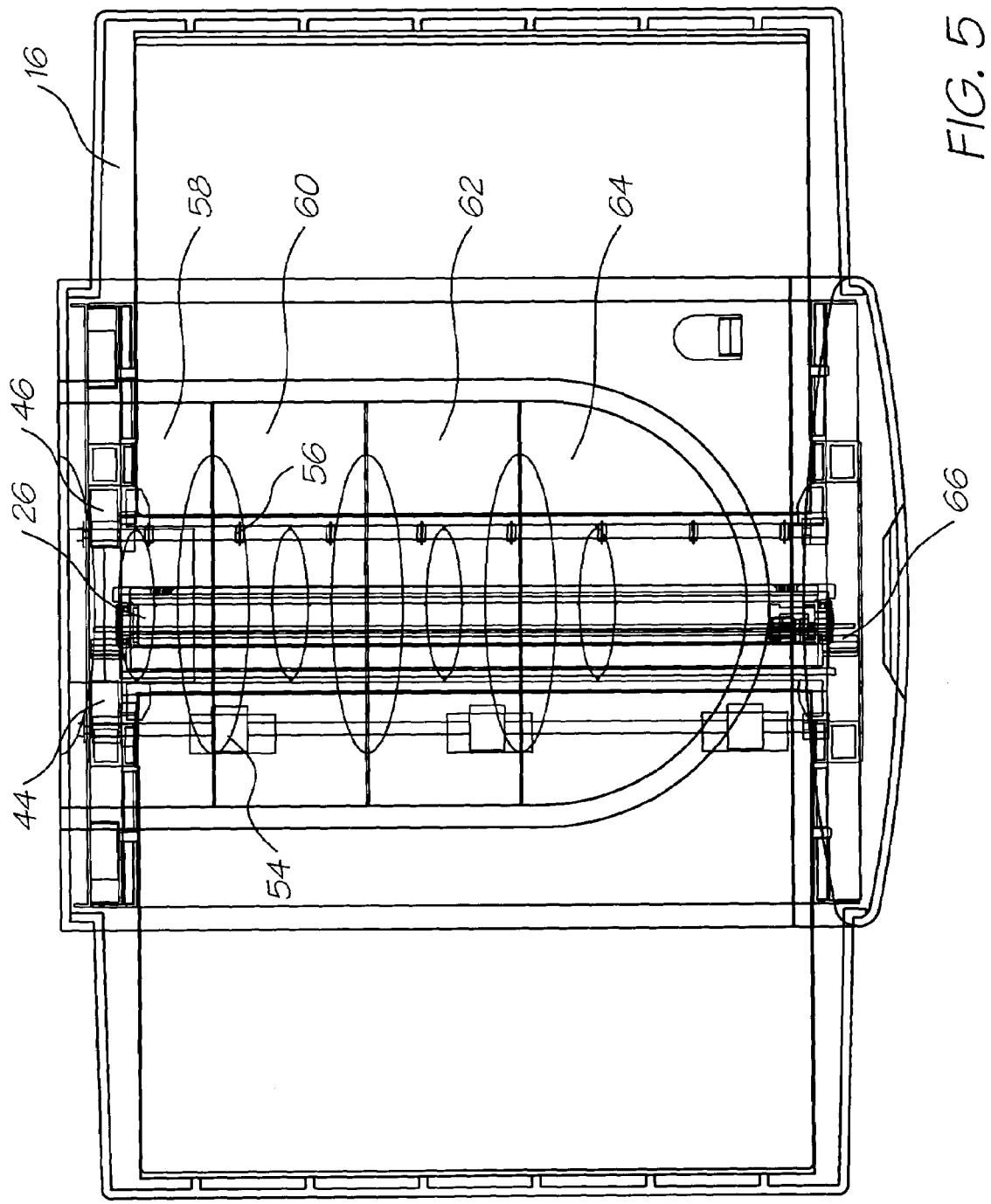
FIG. 5 shows a schematic, sectional plan view of the printer.

As illustrated more clearly in FIG. 5 of the drawings, a sheet of paper to be fed to the print engines 26 is guided by pick-up rollers 54 arranged upstream of the print engines 26 in the paper path. Spike wheel rollers 56 grip a leading edge of the paper, after printing, for guiding the printed paper to a paper tray housing 16 located downstream of the print engines 26 in the paper path. The pick up rollers 54 are driven by a motor assembly 44. Similarly, the spike wheel rollers 56, which are arranged in vertically spaced pairs, are driven by a further motor assembly 46.

Also, as illustrated in FIG. 5 of the drawings, S-print 10 is a four color printer having a cyan ink cartridge 58, a magenta ink cartridge 60, a yellow ink cartridge 62 and a black ink cartridge 64. The ink cartridges 58, 60, 62 and 64 feed ink via hoses 66 to the print engines 26.

A molding 72 (FIG. 6) to which the ink cartridges 58 to 64 are attached is hingedly secured to the remainder of the central section 14 of the housing 12 to reveal an upper part of a chassis 74 of the print engines 26. This upper part 74 can be pivoted about pivot pin 76 to enable access to be gained to an upper print engine 26.1. It is to be noted that the upper print engine 26.1 is secured to the part 74 so that, when the part 74 is pivoted, access can be gained to a lower print engine 26.2 as well as drying infrared lamp 78.

These infrared lamps 78 are mounted on paper guides 80 which guide a sheet of paper 82 between the print engines 26.

The straight paper path allows the paper 82 to be fed at high speed past printheads of the print engines 26.

The two print engines 26.1 and 26.2 are mounted together in an adjustable assembly. As described above, the upper print engine 26.1 can be pivoted upwards to allow access to paper jams and to the lower print engine 26.2 and the infrared drying lamps 78.

Figure 6:
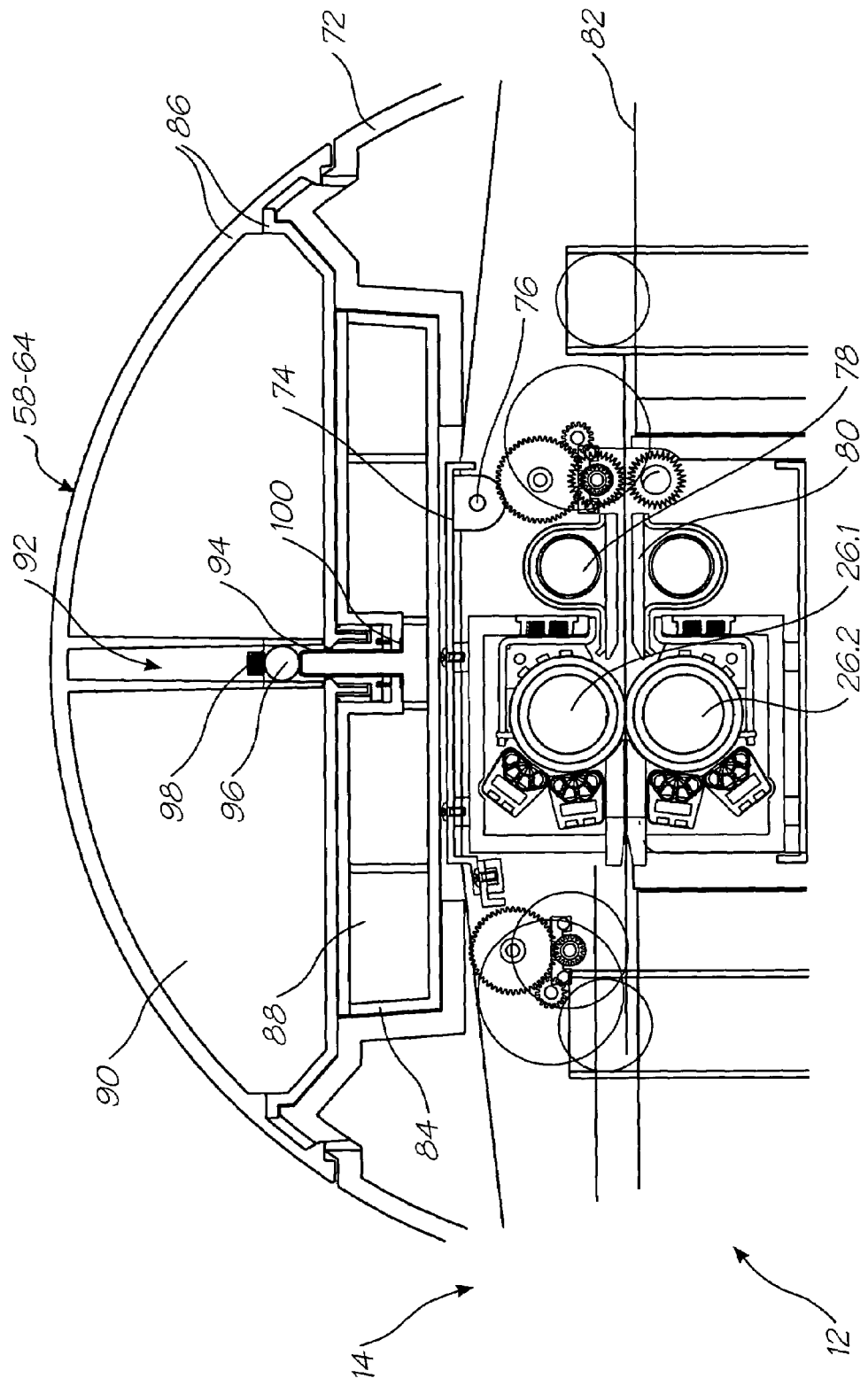
FIG. 6 shows, on an enlarged scale, a schematic, sectional front view of part of the printer.

As schematically illustrated in FIG. 6 of the drawings, the relevant ink cartridges 58 to 64 are snap fits on the top molding 72.

Each ink cartridge 58 to 64 comprises moldings 86 defining a reservoir 90. The reservoir 90 is, in use, in fluid flow communication with a fixed reservoir 88 defined in a molding 84 on top of the print engines 26.

The reservoir 90 is in communication with the fixed reservoir 88 via a passage 92. A pin 94 projects through the passage 92 and is engaged by a ball 96 of the ink cartridge 58 to 64. The ball 96 is urged into engagement with the pin 94 by means of a spring 98. The pin 94 has a collar or flange 100 at its operatively lower end, i.e. that end within the reservoir 88. When the collar 100 is urged off its seat, ink can flow from the reservoir 90 into the reservoir 88.

The reservoir 88 serves to provide an early warning to replace the ink cartridge and makes contact with an embedded QA cartridge chip. Each reservoir 88 connects via the hoses 66 to the printheads of the print engines 26.

Figure 7:
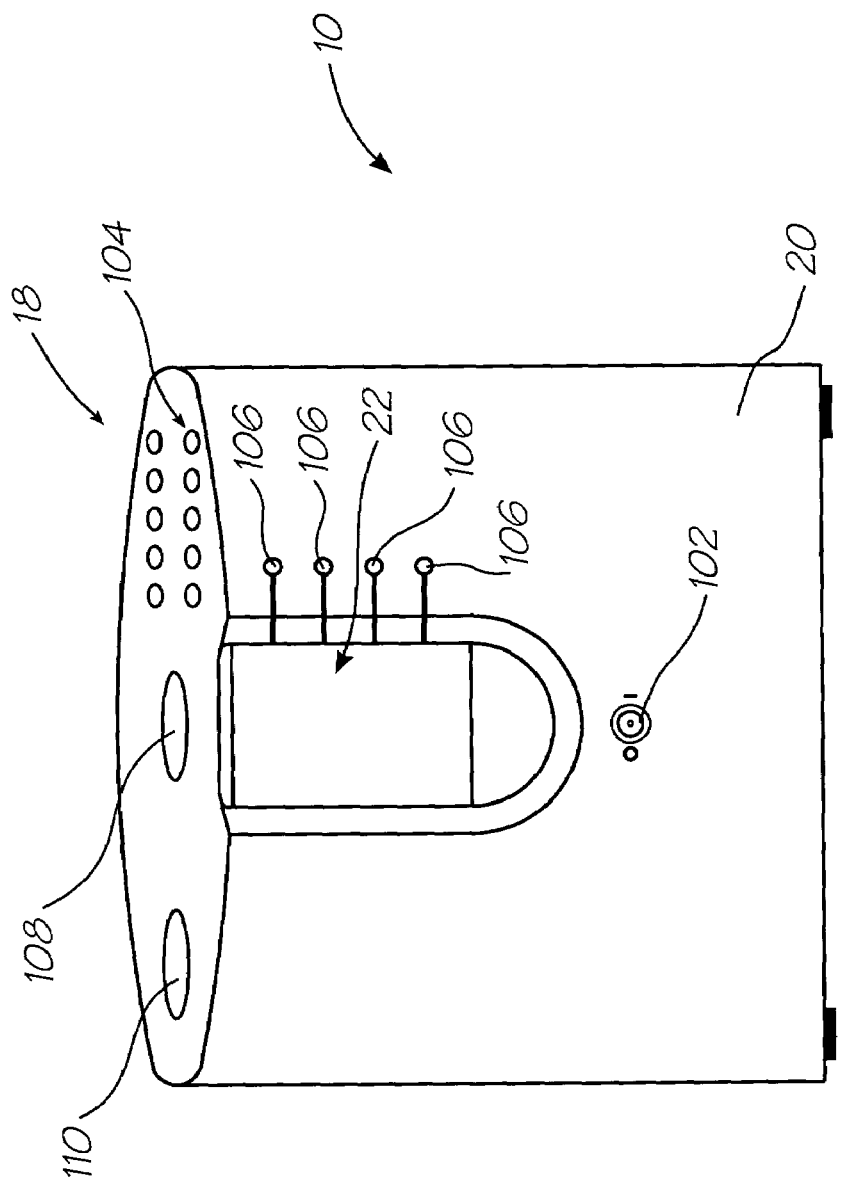
FIG. 7 shows an enlarged front view of a central section of the printer.

Referring now to FIG. 7 of the drawings the front panel 20 of S-print 10 is shown in greater detail. As described above, the front panel 20 contains a color LCD interface 22. A power switch 102 is arranged below the interface 22.

A keypad 104 is also arranged on the front panel 20. The keypad 104 allows the desired number of copies to be entered. Documents to be printed locally, i.e. at the printer 10 can also be selected by an identification number by means of the keypad 104. It will be appreciated that this can be quicker than scrolling through stored documents if there are many such documents.

The LCD interface 22 includes four changeable function buttons 106 for navigating the interface 22.

A print button 108 and a stop button 110 are also arranged on the front panel 20 adjacent to the keypad 104.

Figure 8:
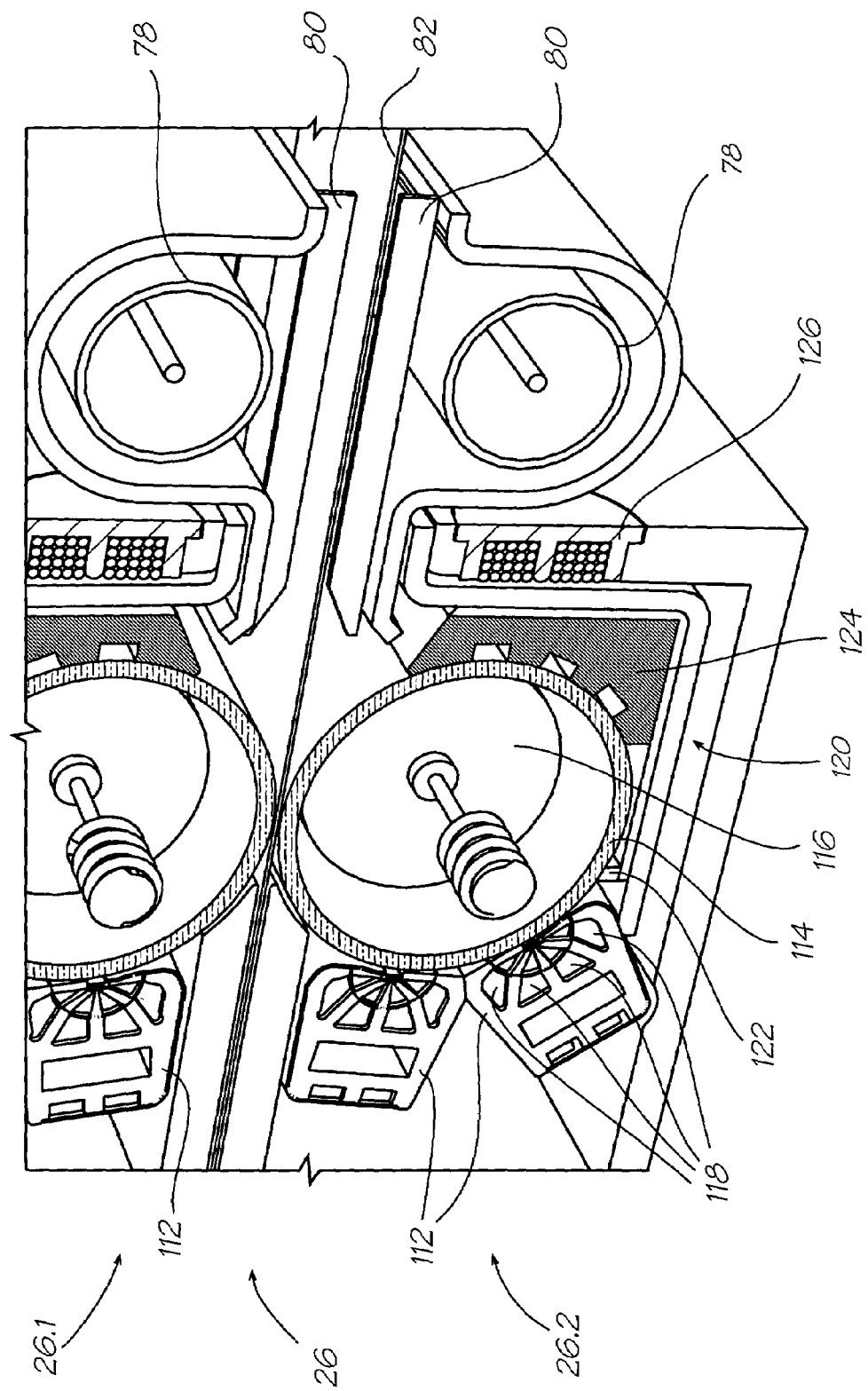
FIG. 8 shows a three-dimensional view of a print engine arrangement of the printer.

Referring to FIG. 8 of the drawings the print engines 26 are discussed in greater detail. As described above, an upper print engine 26.1 and a lower print engine 26.2 are provided. S-print 10 uses duplex print engines 26.1 and 26.2 for simultaneous double-sided printing.

It is to be noted that each print engine 26.1 and 26.2 uses two printheads 112 (only one of which is shown in respect of the print engine 26.1). The two printheads 112 are provided to achieve a 2:1 nozzle redundancy. This allows factory-detected defective nozzles to be bypassed and so maximises the printhead yield.

The printheads 112 print on to a transfer roller 114. The roller 114 is rotatably driven by a co-axially arranged motor 116. Ink deposited on a surface of the roller 114 is, in turn, deposited on the paper 82 during the printing process. In addition, when the printheads 112 are inoperative, the roller 116 is urged into engagement with the printheads 112 for inhibiting evaporation of ink in reservoirs 118 in each printhead assembly 112.

Each print engine 26 includes a cleaning station 120. The cleaning station 120 includes a wiper 122 of a resiliently flexible, elastomeric material and a sponge 124 arranged upstream of the wiper 122 so that the sponge 124 removes ink from the transfer roller 114 before the wiper 122 wipes ink from the transfer roller 114.

Movement of the roller 114 into and out of engagement with the printhead assemblies 112 is controlled by a solenoid arrangement 126.

Figure 9A:
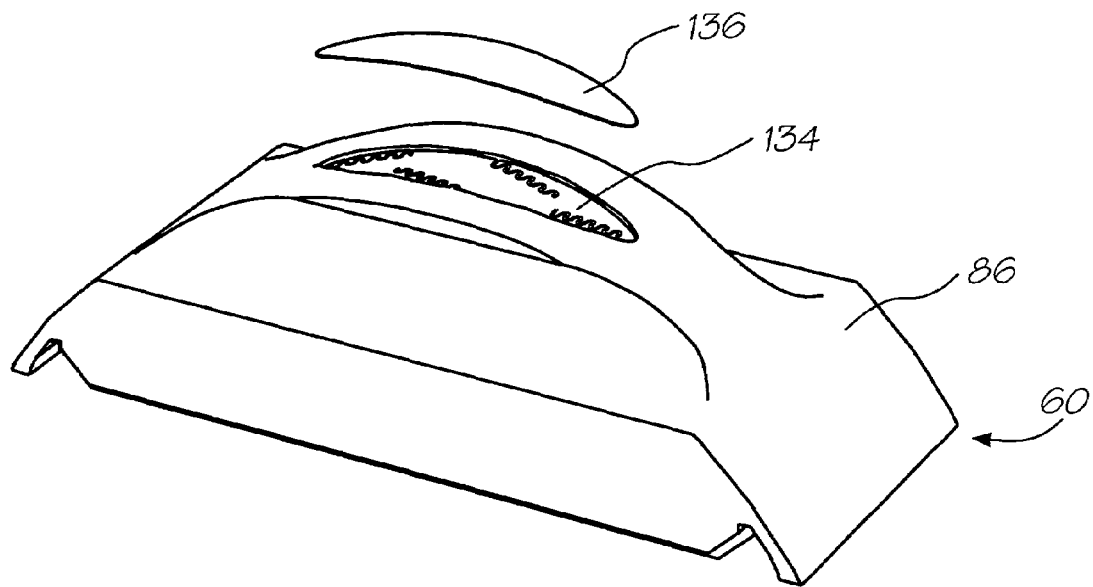
FIG. 9a shows a three-dimensional top view of an ink cartridge of the printer.
Figure 9B:
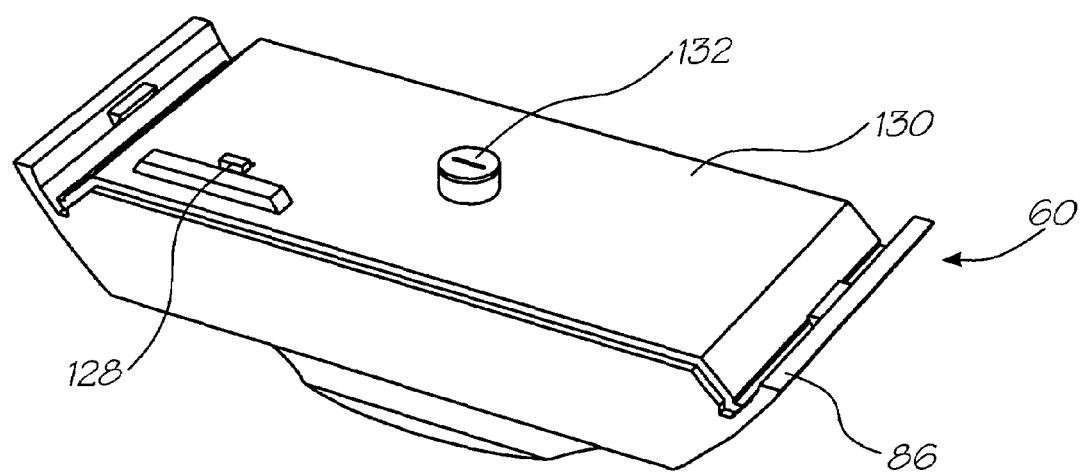
FIG. 9b shows a three-dimensional bottom view of the ink cartridge.

A three dimensional top view of one of the ink cartridges 60 is shown in FIG. 9a of the drawings with a three dimensional bottom view of the cartridge 60 being shown in FIG. 9b of the drawings. The cartridge 60 comprises the moldings 86 which engages the molding 84 in the central section 14 of the housing 12 of S-print 10. A QA chip 128 is shown on a bottom surface 130 of the ink cartridge 60 in FIG. 9b of the drawings.

As shown in FIG. 6 of the drawings, but not shown in FIGS. 9a or 9b of the drawings, each upper molding 86 houses the sprung ball 96 which is held captive against the lower molding 84 to provide a main seal to the cartridge 60. A secondary hydrophobic, elastomeric seal 132 is provided at an entry port on a lower surface 130 of the cartridge 60.

As described above, the cartridge 60 connects to the print engines 26 via the printer ink reservoir 88 by means of the pin 94.

Tortuous air channels 134 (FIG. 9a) are provided at the top of the cartridge 60 under the color label 136. The four ink cartridges 58 to 64 are keyed by plastic protrusions to prevent any incorrect insertion or orientation of the cartridges 58 to 64. Also, it is to be noted that the black cartridge 64 holds twice the volume of the other cartridges due to the greater use of black ink.

3 Memjet-Based Printing

A Memjet printhead 112 produces 1600 dpi bi-level CMYK (Cyan, Magenta, Yellow, blacK). On low-diffusion paper, each ejected drop forms an almost perfectly circular 22.5 micron diameter dot. Dots are easily produced in isolation, allowing dispersed-dot dithering to be exploited to its fullest. Since the Memjet printhead 112 is the width of the page and operates with a constant paper velocity, the four color planes are printed in good registration, allowing accurate dot-on-dot printing. Since there is consequently no spatial interaction between color planes, the same dither matrix is used for each color plane. Dot-on-dot printing minimizes 'muddying' of midtones caused by inter-color bleed.

A page layout may contain a mixture of images, graphics and text. Continuous-tone (contone) images and graphics are reproduced using a stochastic dispersed-dot dither. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be free of objectionable low-frequency patterns when tiled across the image. As such its size typically exceeds the minimum size required to support a particular number of intensity levels (e.g. 16×16×8 bits for 257 intensity levels). S-print 10 uses a dither volume of size 64×64×3×8 bits. The volume provides an extra degree of freedom during the design of the dither by allowing a dot to change states multiple times through the intensity range (rather than just once as in a conventional dither matrix).

Human contrast sensitivity peaks at a spatial frequency of about 3 cycles per degree of visual field and then falls off logarithmically, decreasing by a factor of 100 beyond about 40 cycles per degree and becoming immeasurable beyond 60 cycles per degree. At a normal viewing distance of 12 inches (about 300 mm), this translates roughly to 200-300 cycles per inch (cpi) on the printed page, or 400-600 samples per inch according to Nyquist's theorem.

In practice, contone resolution above about 300 ppi is of limited utility outside special applications such as medical imaging. Offset printing of magazines, for example, uses contone resolutions in the range 150 to 300 ppi. Higher resolutions contribute slightly to color error through the dither.

Black text and graphics are reproduced directly using bi-level black dots, and are therefore not antialiased (i.e. low-pass filtered) before being printed. Text is therefore super-sampled beyond the perceptual limits discussed above, to produce smoother edges when spatially integrated by the eye. Text resolution up to about 1200 dpi continues to contribute to perceived text sharpness (assuming low-diffusion paper, of course).

S-print 10 uses a contone resolution of 320 ppi (i.e. 1,600÷5), and a black text and graphics resolution of 1600 dpi.

4 Document Data Flow

Document transmission and document rasterization are decoupled to shield the user from interactions between the size and complexity of the document, and the memory capacity and RIP performance of S-print 10. This is achieved by storing each document's page description language (PDL) file on the internal hard disk 50.

Because of the high resolution of the Memjet printhead 112, each page must be printed at a constant speed to avoid creating visible artifacts. This means that the printing cannot be varied to match the input data rate. Document rasterization and document printing are therefore decoupled to ensure the printhead 112 has a constant supply of data. A page is never printed until it is fully rasterized. This is achieved by storing a compressed version of each rasterized page image on the internal hard disk 50.

This decoupling also allows the RIP to run ahead of the printer 10 when rasterizing simple pages, buying time to rasterize more complex pages.

The user indicates whether a document is to be stored permanently on the hard disk 50, printed, or both. So long as there is disk space available, the pages of transient documents are also cached on the disk 50 until printed. This is particularly efficient when multiple copies of complex documents are being printed. This so-called electronic collation also obviates the need for an external collating mechanism, since each copy of a document is printed in its entirety before the next copy.

Because contone color images are reproduced by stochastic dithering, but black text and line graphics are reproduced directly using black dots, the compressed page image format contains a separate foreground bi-level black layer and background contone color layer. The black layer is composited over the contone layer after the contone layer is dithered.

Figure 10:
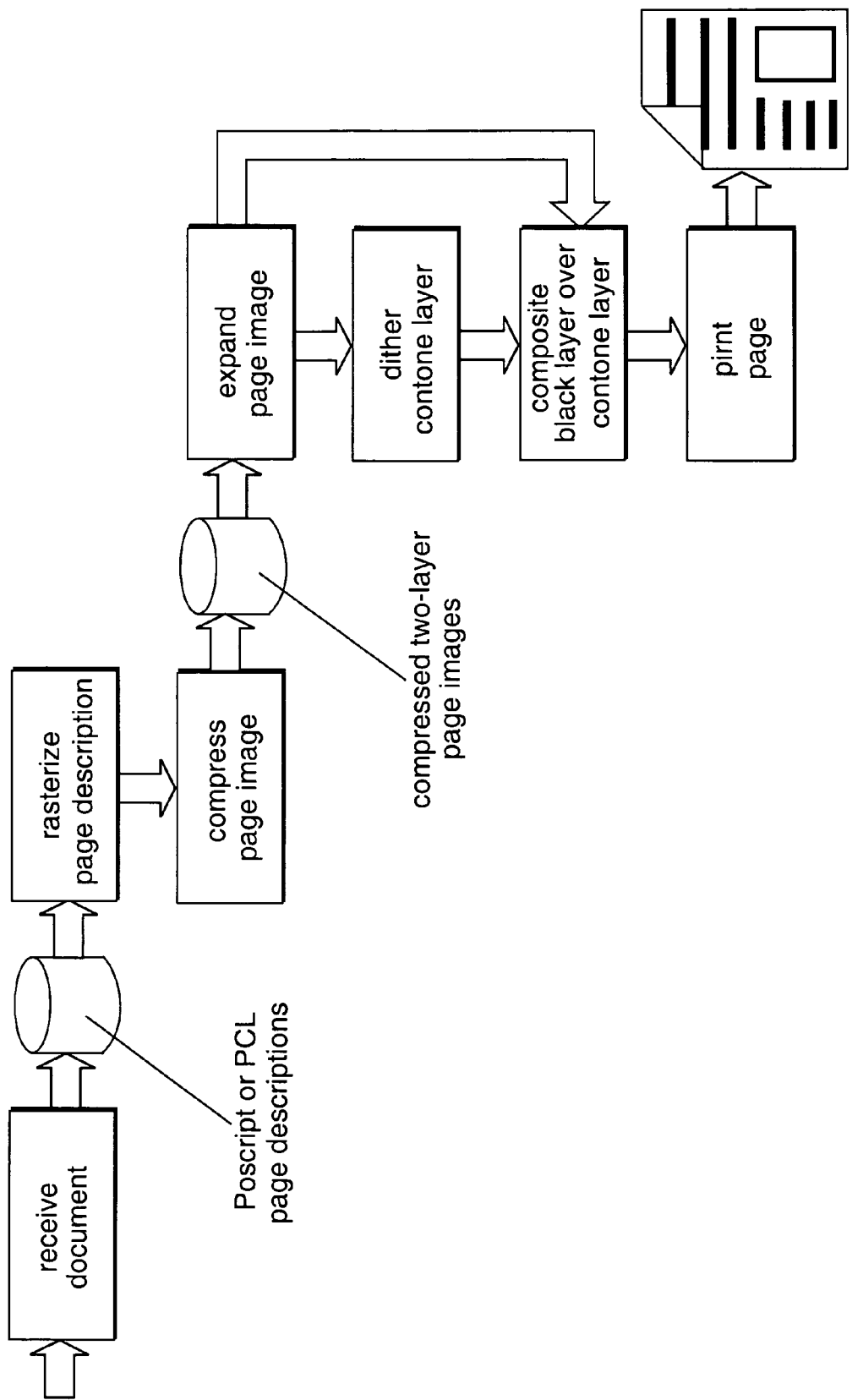
FIG. 10 shows a diagrammatic representation of document data flow in the printer.

FIG. 10 shows the flow of an S-print document from network to printed page.

At 320 ppi, an A4/Letter page of contone CMYK data has a size of 38 MB. Using lossy contone compression algorithms such as JPEG, contone images compress with a ratio up to 10:1 without noticeable loss of quality, giving a compressed page size of 3.8 MB.

At 1600 dpi, an A4/Letter page of bi-level data has a size of 30 MB. Coherent data such as text compresses very well. Using lossless bi-level compression algorithms such as Group 4 Facsimile, ten-point text compresses with a ratio of about 20:1, giving a compressed page size of 1.5 MB.

Once dithered, a page of CMYK contone image data consists of 120 MB of bi-level data. Using lossless bi-level compression algorithms on this data is pointless precisely because the optimal dither is stochastic—i.e. since it introduces hard-to-compress disorder.

The two-layer compressed page image format therefore exploits the relative strengths of lossy JPEG contone image compression and lossless bi-level text compression. The format is compact enough to be storage-efficient, and simple enough to allow straightforward realtime expansion during printing.

Since text and images normally do not overlap, the normal worst-case page image size is 3.8 MB (i.e. image-only), while the normal best-case page image size is 1.5 MB (i.e. text-only). The absolute worst-case page image size is 5.3 MB (i.e. text over image). Assuming a third of an average page contains images, the average page image size is 2.3 MB. The standard 14 GB internal hard disk therefore holds over 6000 such pages.

5 Printer Controller Architecture

Figure 11:
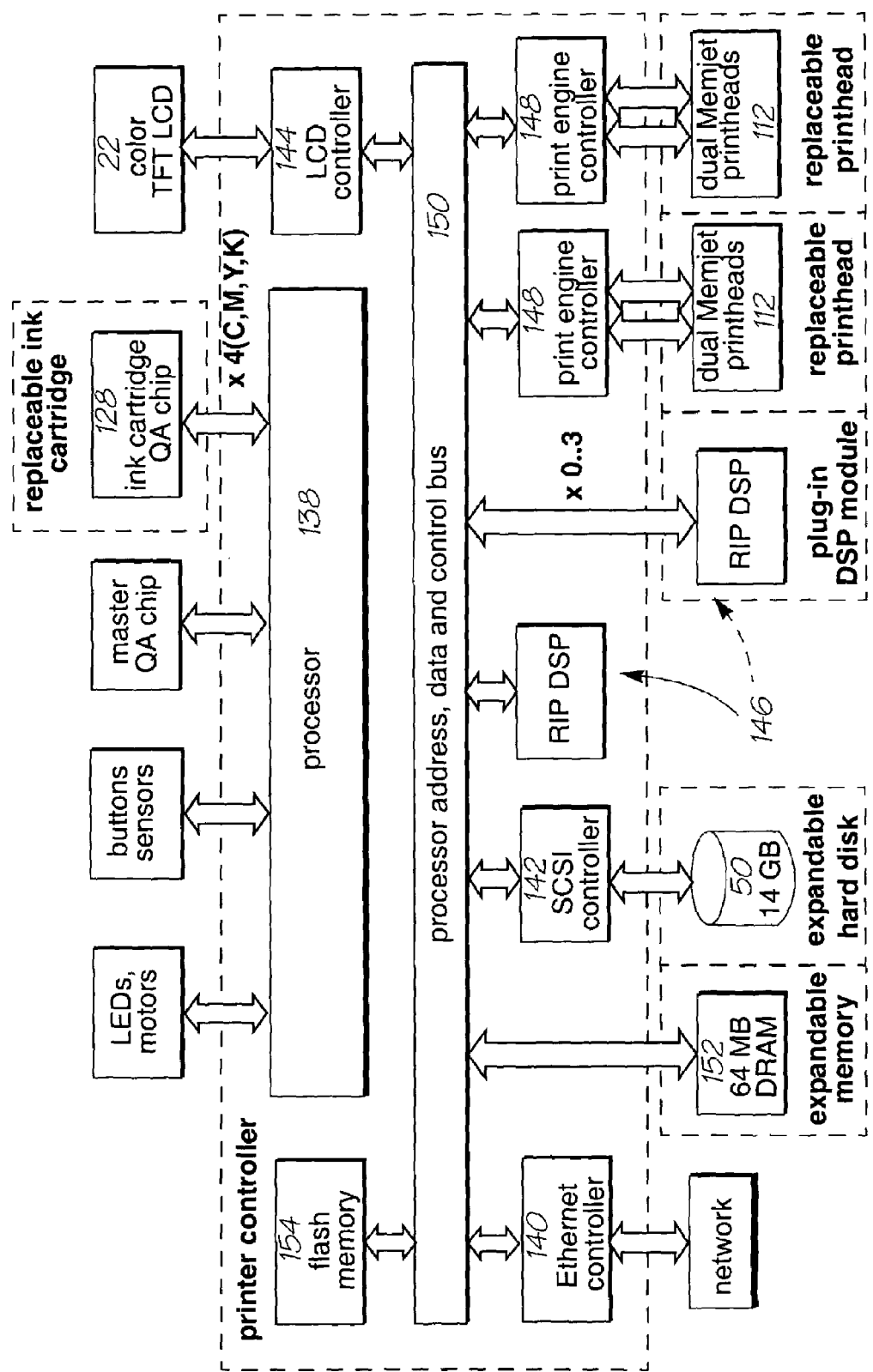
FIG. 11 shows a block diagram of the printer controller architecture.

The S-print 10 printer controller consists of a controlling processor 138 (FIG. 11), various peripheral controllers 140, 142 and 144, a raster image processor (RIP) DSP farm 146, and duplexed page expansion processors 148. These components are discrete and communicate via a shared bus 150 and a shared 64 MB memory 152.

The controlling processor 138 handles communication with the network via an Ethernet controller 140, controls the internal hard disk 50 via the SCSI controller 142 and controls the LCD 22 via the LCD controller 144. The controller 138 also controls the paper transport, handles ink cartridge authentication and ink monitoring, and feeds and synchronizes the RIP and the print engine controllers 148. It consists of a medium-performance general-purpose microprocessor. Its associated peripheral controllers include a 10/100Base-T Ethernet controller (140), a SCSI disk controller (142), and a color TFT LCD controller (144). Optional controllers include an IEEE 1394 (Firewire) controller and a USB 2.0 controller for high-speed point-to-point communication with a workstation or server.

The RIP DSP farm 146 rasterizes and compresses page descriptions to S-print's compressed page format. The DSP farm 146 consists of between one and four general-purpose high-performance DSPs. Each additional DSP comes as a field-installable plug-in module. Each print engine controller, or printhead controller 148 expands, dithers and prints page images to its associated replicated printhead 112 in real time (i.e. at 60 ppm). The pointless precisely because the optimal dither is stochastic—i.e. since it introduces hard-to-compress disorder.

The two-layer compressed page image format therefore exploits the relative strengths of lossy JPEG contone image compression and lossless bi-level text compression. The format is compact enough to be storage-efficient, and simple enough to allow straightforward realtime expansion during printing.

Since text and images normally do not overlap, the normal worst-case page image size is 3.8 MB (i.e. image-only), while the normal best-case page image size is 1.5 MB (i.e. text-only). The absolute worst-case page image size is 5.3 MB (i.e. text over image). Assuming a third of an average page contains images, the average page image size is 2.3 MB. The standard 14 GB internal hard disk therefore holds over 6000 such pages.

5 Printer Controller Architecture

The S-print 10 printer controller consists of a controlling processor 138 (FIG. 11), various peripheral controllers 140, 142 and 144, a raster image processor (RIP) DSP farm 146, and duplexed page expansion processors 148. These components are discrete and communicate via a shared bus 150 and a shared 64 MB memory 152.

The controlling processor 138 handles communication with the network via an Ethernet controller 140, controls the internal hard disk 50 via the SCSI controller 142 and controls the LCD 22 via the LCD controller 144. The controller 138 also controls the paper transport, handles ink cartridge authentication and ink monitoring, and feeds and synchronizes the RIP and the print engine controllers 148. It consists of a medium-performance general-purpose microprocessor. Its associated peripheral controllers include a 10/100Base-T Ethernet controller (140), a SCSI disk controller (142), and a color TFT LCD controller (144). Optional controllers include an IEEE 1394 (Firewire) controller and a USB 2.0 controller for high-speed point-to-point communication with a workstation or server.

The RIP DSP farm 146 rasterizes and compresses page descriptions to S-print's compressed page format. The DSP farm 146 consists of between one and four general-purpose high-performance DSPs. Each additional DSP comes as a field-installable plug-in module.

Each print engine controller, or printhead controller 148 expands, dithers and prints page images to its associated replicated printhead 112 in real time (i.e. at 60 ppm). The duplexed print engines 26 print both sides of the page simultaneously (i.e. at 120 ppm).

The printer controller's flash memory 154 holds the software for both the processor 138 and the DSPs 146. This is copied to main memory 152 at boot time. The flash memory 154 also holds the defect lists for the two replicated printheads 112. These are copied to the print engine controllers 148 at boot time.

5.1 Detailed Document Data Flow

The main processor 138 receives the document's page description language (PDL) file and stores it on the internal hard disk 50. It then runs the appropriate RIP software on the DSPs 146.

The DSPs 146 rasterize each page description and compress the rasterized page image. The main processor 138 stores each compressed page image on the hard disk 50. The simplest way to load-balance multiple DSPs 146 is to let each DSP 146 rasterize a separate page. The DSPs 146 can always be kept busy since an arbitrary number of rasterized pages can, in general, be stored on the internal hard disk 50. This strategy can lead to poor DSP utilization, however, when rasterizing short documents.

The main processor 138 passes back-to-back page images to the controllers 148 of the duplexed print engines 26. Each print engine controller 148 stores the compressed page image into its local memory, and starts the page expansion and printing pipeline. Page expansion and printing is pipelined because it is impractical to store a 120 MB bi-level CMYK image in memory.

The first stage of the pipeline expands the JPEG-compressed contone CMYK layer. The second stage, in parallel with the first, expands the Group 4 Fax-compressed bi-level black layer. The third stage dithers the contone CMYK layer, and composites the bi-level black layer over the resulting bi-level CMYK layer. The fourth stage prints the bi-level CMYK data via the printhead interface which controls the Memjet printhead 112.

The main processor 138 streams compressed page images from the hard disk 50 to the print engine controllers 148 at the required 120 ppm rate (i.e. 4.6 MB/s on average, or 10.6 MB/s worst-case).

TABLE 1

Print engine controller page image and FIFO data flow

| process | input format | input window | output format | output window | input rate | output rate |
|---|---|---|---|---|---|---|
| receive contone | — | — | JPEG stream | 1 | — | 3.8 MB/s (10 Mp/s) |
| receive bi-level | — | — | G4Fax stream | 1 | — | 1.5 MB/s (250 Mp/s) |
| expand contone | JPEG stream | — | 32-bit CMYK | 8 | 3.8 MB/s (10 Mp/s) | 38 MB/s (10 Mp/s) |
| expand bi-level | G4Fax stream | — | 1-bit K | 1 | 1.5 MB/s (250 Mp/s) | 30 MB/s (250 Mp/s) |
| dither | 32-bit CMYK | 1 | —$^a$ | — | 38 MB/s (10 Mp/s$^b$) | — |
| composite | 1-bit K | 1 | 4-bit CMYK | 1 | 30 MB/s (250 Mp/s) | 120 MB/s (250 Mp/s) |
| print | 4-bit CMYK | 24, 1$^c$ | — | — | 120 MB/s (250 Mp/s) | — |
| | | | | | 193 MB/s | 193 MB/s 387 MB/s |

$^a$dither combines with composite, so there is no external data flow between them
$^b$320 ppi => 1600 dpi (5 × 5 expansion)
$^c$Needs a window of 24 lines, but only advances 1 line The print engine data flow is summarized in Table 1. The aggregate traffic to/from memory is 387 MB/s, all but 5.3 MB/s of which relates to the FIFOs.

Each stage communicates with the next via a FIFO. Each FIFO is organized into lines, and the minimum size (in lines) of each FIFO is designed to accommodate the output window (in lines) of the producer and the input window (in lines) of the consumer. The inter-stage memory FIFOs are described in Table 2.

TABLE 2

Print engine controller local memory FIFOs

| FIFO | format and line size | number of lines | FIFO size |
|---|---|---|---|
| contone CMYK | 32-bit interleaved CMYK (320 ppi × 11.7" × 32 = 15.0 KB) | 8 × 2 = 16 | 240 KB |
| bi-level K | 1-bit K (1600 dpi × 11.7" × 1 = 2.3 B) | 1 × 2 = 2 | 5 KB |
| bi-level CMYK | 4-bit planar odd/even CMYK (1600 dpi × 11.7" × 4 = 9.1 KB) | 24 + 1 = 25 | 229 KB |
| | | | 474 KB |

Because the two printheads 112 of each redundant printhead pair are separated by about 8 mm on the transfer roller (or about 500 printed lines at 1600 dpi), an additional 500 lines of bi-level CMYK must be buffered between the ditherer/compositor unit 176 and the printhead interface 178. This in turn translates to about 4.5 MB of additional FIFO memory, or about 5 MB of FIFO memory in total.

The need for this additional FIFO memory can be eliminated by expanding each page image twice in parallel, i.e. once each for the two printheads 112 of each redundant printhead pair, staggered to match the physical separation of the printheads. This is most easily done by replicating the print engine controller 148 for each printhead 112. Replication is particularly relevant in the case of the pipelined (as opposed to shared-memory) print engine controller 148 described below, where the provision of 5 MB of on-chip FIFO memory is impractical.

It is also possible to run each print engine controller 148 at twice the rate so that it can expand each page image twice in the time it takes to print the page image once.

Whenever each page image is expanded twice in parallel, FIFO memory must be doubled to about 1 MB.

5.2 Print Engine Controller Architecture

The print engine controller 148 is implemented as a single custom chip.

Figure 12:
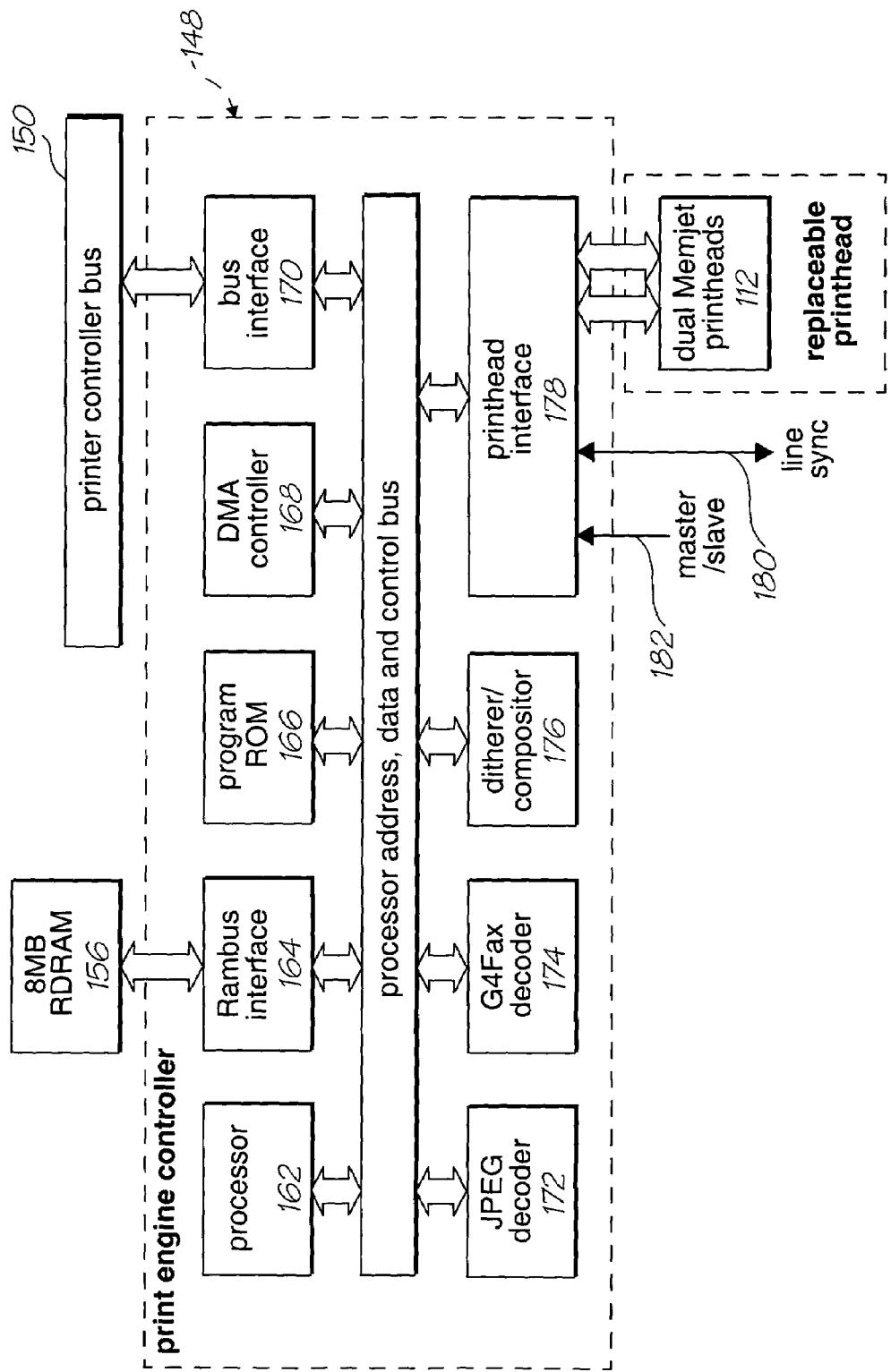
FIG. 12 shows a block diagram of one embodiment of the print engine controller architecture.
Figure 13:
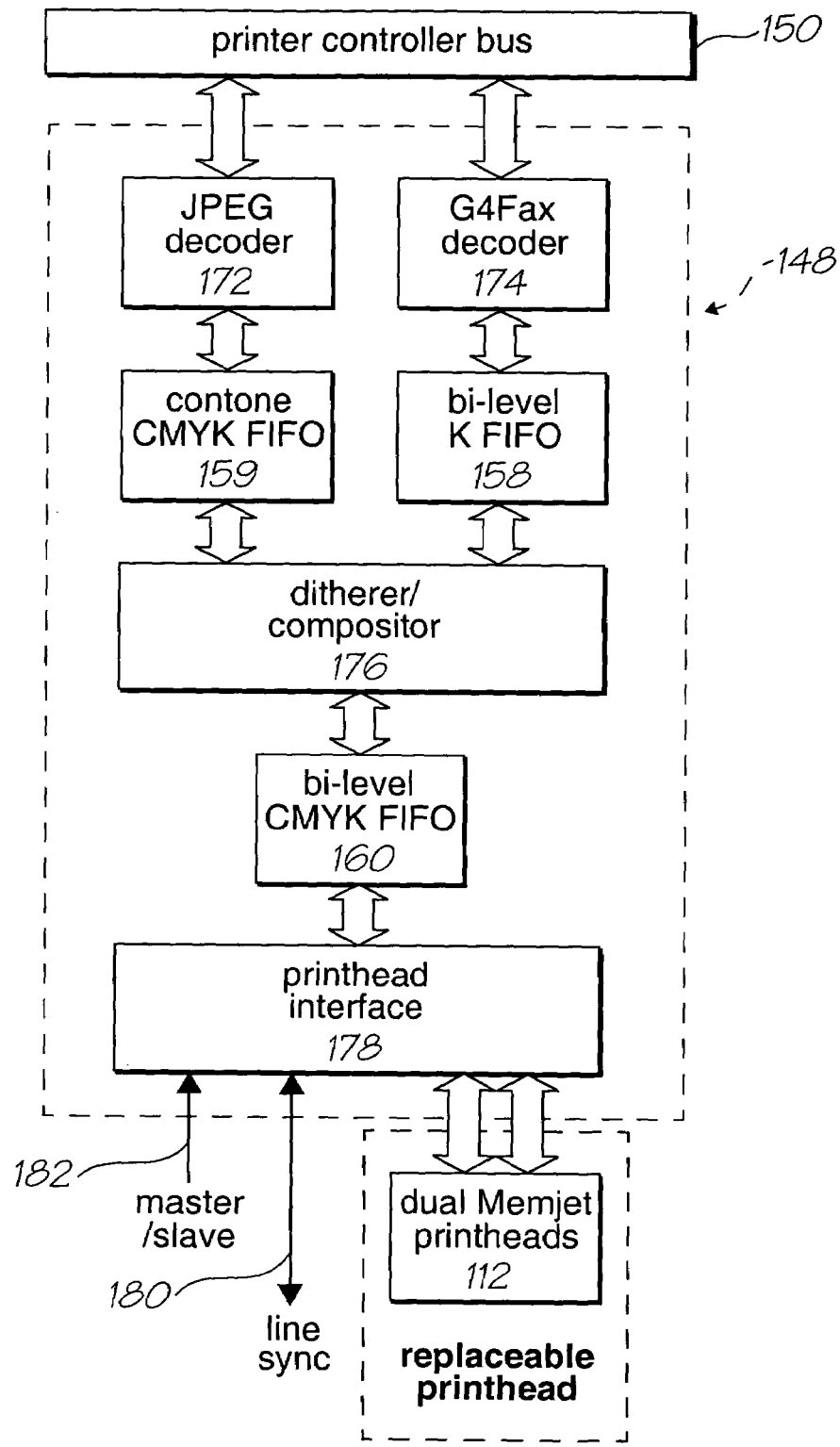
FIG. 13 shows a block diagram of another embodiment of the print engine controller architecture.

There are two architectural variants of the print engine controller 148. The shared-memory version, illustrated in FIG. 12, uses a local off-chip RDRAM 156 to support the aggregate memory bandwidth required by page expansion and printing. The pipelined version, illustrated in FIG. 13, uses dedicated on-chip FIFOs 158, 159, 160.

The shared-memory print engine controller 148 consists of a general-purpose processor 162, a high-speed Rambus interface 164 to the off-chip RDRAM 156, a small program ROM 166, a DMA controller 168, and an interface 170 to the printer controller bus 150.

Both print engine controllers' page expansion and printing pipeline consists of a standard JPEG decoder 172, a standard Group 4 Fax decoder 174, a custom ditherer/compositor unit 176, and a custom interface 178 to the Memjet printheads 112.

The ditherer/compositor unit 176 and the printhead interface 178 are described in greater detail in co-pending U.S. patent application Ser. No. 09/436,744 which is incorporated herein by reference.

In the shared-memory version, the FIFOs are located in the dedicated off-chip RDRAM 156, and all inter-stage communication is controlled by the local processor via the DMA controller 168. In the pipelined version, the FIFOs 158, 159, 160 are on-chip, and the stages are self-synchronizing.

In the shared-memory version, the decoders 172, 174 obtain page data from the main processor 138 via the local memory. In the pipelined version, the decoders 172, 174 obtain page data directly from the main processor 138 over the printer controller bus 150.

When several print engine controllers 148 are used in unison, such as in a duplexed configuration, they are synchronized via a shared line sync signal on line 180. Only one print engine controller 148, selected via an external master/slave pin 182, generates the line sync signal onto the shared line 180.

5.3 Printhead Timing

Each print engine controller 148 prints an A4/Letter page in one second. Since S-print 10 uses a 12" printhead 112 to print the long dimension of the page (11.7"), the short dimension of the page (8.5") needs to pass the printhead 112 in one second. At 1600 dpi, this equates to a 13.6 KHz line rate. This is well within the operating frequency of the Memjet printhead 112, which in the current design exceeds 30 KHz.

5.4 Printhead Characterization

Each redundant 12" print engine 26 contains two complete 12" printheads 112, i.e. 76,800 nozzle pairs, characterized and matched so that no paired nozzles are both defective.

Printhead defects are either characterized and matched one segment at a time, or after the entire printhead has been built. In the former case nozzles are tested before integration with the ink path, and so are tested without ink. In the latter case nozzles are tested after integration with the ink path, and so are tested with ink. Segment-wise characterization gives a higher yield, but at a higher testing cost. Segment-wise characterization is therefore only preferable to printhead-wise characterization when defect densities are still high.

The defect list associated with a redundant printhead is stored in the manufacturing database, indexed by the printhead's serial number and recorded as a barcode on its cartridge. When the printhead cartridge is finally inserted into a printer during manufacture, the defect list is retrieved using the barcode, and is written to the flash memory of the printer's embedded printer controller.

If the printhead cartridge is replaced in the field, then a new defect list is downloaded remotely from the manufacturing database to the printer controller via its network interface, using the new printhead cartridge's barcode.

The defect list associated with each redundant printhead pair is copied from the printer controller's flash memory 154 to the corresponding print engine controller 148 at boot time. During printing, each print engine controller 148 consults its defect list to determine which nozzle of each nozzle pair to direct data to. When one nozzle of a nozzle pair is defective, the print engine controller 148 directs data to the other nozzle. Printhead characterization and matching ensures that the two nozzles of a nozzle pair are never both defective.

I claim:

1. An inkjet pagewidth printer that comprises
   a chassis;
   a print media feed mechanism mounted on the chassis to feed print media along a feed path;
   a pair of opposed transfer rollers that are rotatably mounted on the chassis to contact the print media simultaneously on both sides of the print media as it moves along the feed path;
   a pair of pagewidth color inkjet printhead assemblies mounted on the chassis to eject ink on a respective one of the transfer rollers so that ink can be transferred simultaneously to both sides of the print media by the transfer rollers;
   a displacement mechanism operatively engaged with the transfer rollers to displace the transfer rollers out of biased engagement with the respective printheads, when the printheads are inoperative, and into engagement with the print media, when the printheads are operative, so as to transfer the ink on the transfer rollers to the print media;
   a cleaning station operatively positioned with respect to the transfer rollers to clean remaining ink from the transfer rollers subsequent to the ink being transferred from the transfer rollers to the print media;
   control circuitry to control operation of the printer; and
   a memory for storing data related to images and text to be printed.

2. An inkjet pagewidth printer as claimed in claim 1, in which the print media feed mechanism includes a platen and driven roller assembly to feed sheets of print media along the feed path.

3. An inkjet pagewidth printer as claimed in claim 1, which includes a number of ink cartridges for storing respective inks, and ink conduits that interconnect respective cartridges and the printhead assemblies.

4. An inkjet pagewidth printer as claimed in claim 1, in which the control circuitry includes:
   a control and data bus;
   a network controller connected to the control and data bus to permit the printer to be connected to a network;
   a processor connected to the control and data bus to receive and process data to be printed;
   a pair of print engine controllers connected to the control and data bus to control operation of the printhead assemblies; and
   interface circuitry to permit the memory to be connected to the control and data bus.

5. An inkjet pagewidth printer as claimed in claim 4, in which each print engine controller includes:
   a control and data bus;
   memory interface circuitry connected to the control and data bus;
   expansion circuitry connected to the control and data bus to receive compressed data and to expand said compressed data;
   bus interface circuitry connected to the control and data bus to communicate data from a printer controller bus to the control and data bus; and
   printhead interface circuitry connected to the control and data bus to communicate control and print data to the printhead assemblies.

6. An inkjet pagewidth printer as claimed in claim 5, in which the expansion circuitry includes decoding, dithering and compositing circuitry.

7. An inkjet pagewidth printer as claimed in claim 1, in which the memory is a hard disk.

* * * * *